No. 644,822. Patented Mar. 6, 1900.
F. E. HAWKSWORTH.
CAR AXLE.
(Application filed Dec. 20, 1899.)
(No Model.)
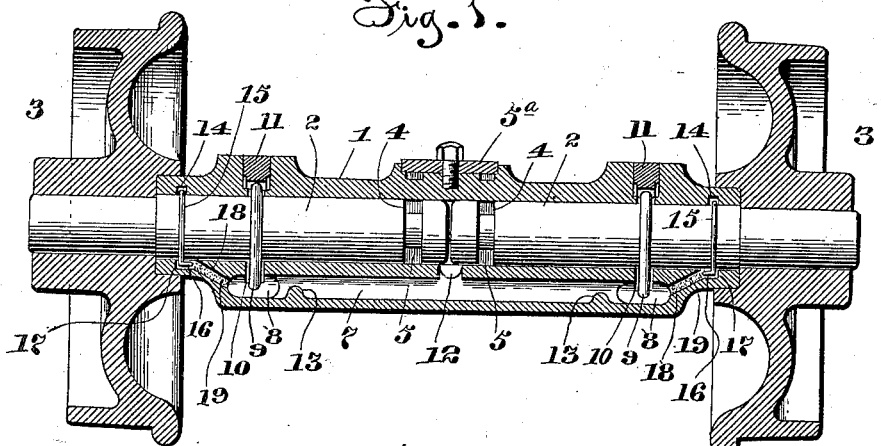
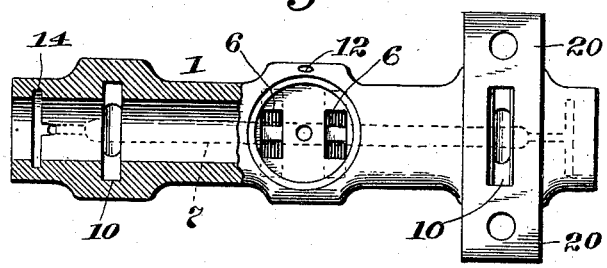
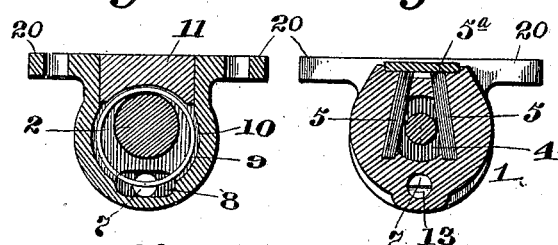 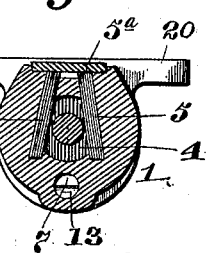 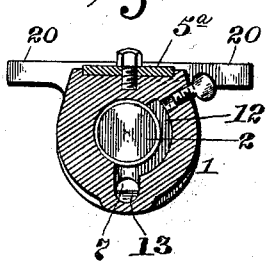
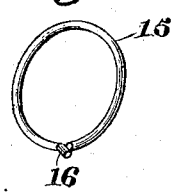 
Witnesses
Marcus L. Byng.
E. V. Byng.
Inventor
Frank E. Hawksworth
by
Mason Fenwick & Lawrence
his Attorney

UNITED STATES PATENT OFFICE.

FRANK E. HAWKSWORTH, OF HELENA, MONTANA.

CAR-AXLE.

SPECIFICATION forming part of Letters Patent No. 644,822, dated March 6, 1900.

Application filed December 20, 1899. Serial No. 741,048. (No model.)

*To all whom it may concern:*

Be it known that I, FRANK E. HAWKSWORTH, a citizen of the United States, residing at Helena, in the county of Lewis and Clarke and State of Montana, have invented certain new and useful Improvements in Car-Axles; and I do hereby declare the following to be a full, clear, and exact description of the invention, such as will enable others skilled in the art to which it appertains to make and use the same.

My invention relates to improvements in axle-boxes, and particularly to car-axle boxes which are adapted to receive divided axles, which are secured by a suitable means in the said box.

It consists in certain novel constructions, combinations, and arrangement of parts, as will be hereinafter fully described and claimed.

In the accompanying drawings, Figure 1 represents a vertical section through a car-axle box, the axles arranged therein being shown in elevation. Fig. 2 represents a top plan view of the said box, a portion of the same being shown in horizontal section. Fig. 3 represents a vertical transverse section through one of the oiling-rings. Fig. 4 represents a detail transverse section on the line with a pair of the locking-pins. Fig. 5 is a detail sectional view illustrating one means of introducing oil into the oil-chamber. Fig. 6 represents a detail perspective view of one of the scraping-rings, and Fig. 7 is a detail view of one of the locking-keys.

1 in the drawings represents an axle-box, and 2 2 shaft-sections adapted to be mounted therein.

My improved axle-box may be employed in connection with wheels and axles of various kinds, but is especially adapted for car-axles formed of divided sections, the bearings being arranged at their inner ends.

As illustrated in the drawings, the axle-box 1 is made of sufficient length to properly space the wheels 3 3 at a suitable distance from each other. The wheels 3 3 are rigidly secured to the shaft-sections 2 2, so as to turn therewith. The inner ends of the shaft-sections 2 2 are preferably provided with annular grooves, as 4 4, which are engaged by locking-pins, as 5 5.

The locking-pins are preferably four in number (two for each axle-section) and are inserted through openings 6 6 in the top of the axle-box. A suitable cap-plate, as 5$^a$, may be used to hold the said pins in position. As seen in Fig. 4 of the drawings, the pins are preferably arranged so as to diverge from each other and to pass upon either side of the axle-sections through the annular grooves 4 4, thereby locking the axle-sections in the box and preventing them from becoming disengaged therefrom. This means of attaching the axles to the boxes permits the said axles to revolve freely in the said boxes. The axle-box 1 is bored to exactly fit the shaft-sections 2 2. The lower portion of the axle-box 1 is made of sufficient thickness to accommodate an oil-chamber, as 7. The oil-chamber extends nearly the full length of the axle-box and is provided at each end with enlarged portions, as 8 8, into which lubricating-rings 9 9 are adapted to dip. Slots, as 10 10, enter the said enlargements 8 8 from the upper side and receive the said lubricating-rings 9 9. The slots 10 10 extend entirely around the shaft-sections 2 and are open on the upper side of the axle-box, so that the rings 9 9 can be readily inserted in place. The upper openings of the said slots are preferably closed by blocks, as 11 11, for holding the rings in place, said blocks having a segmental bearing-surface upon their under sides for holding the rings in proper position no matter what the movement of the axles. Oil may be introduced into the oil-chamber 7 7 through a central aperture, as at 12. The oil-chamber 7 is provided with raised portions, as at 13 13, near each end, which operate to retain a proper quantity of oil at each end of the said chamber to engage the lubricating-rings 9 9. The swaying of the axle-box from side to side will operate to keep the recesses at each end of the oil-chamber filled with sufficient oil to always engage the lubricating-rings. Near each end of the axle-box and interiorly thereof are formed annular passages or grooves, as 14 14, adapted to receive scraping-rings, as 15. The said scraping-rings, as seen in Fig. 6 of the drawings, are preferably split, one end of each ring being turned at right angles to the plane of the ring, as at 16. The said bent end of each ring is adapted to engage a recess, as 17, formed in the lower portion of the groove 14. A passage, as 18, leads from each recess 17 downwardly into the chambers 8 8, the said passages 18 being preferably filled with a wicking or packing of felt or other suitable substance, as at 19. The scraping-rings 15 are inserted into the recesses 14 before the axles are put in place and are made sufficiently tight to slightly grip the said axles. They will be prevented from turning with the said axles by means of the projections 17 engaging the recesses formed in the axle-box. They will thus operate to prevent oil from passing beyond them upon the said axles and will lead the oil back through the passages 18 18 into the recesses 8 8. Wicks or packings 19 will prevent the sudden gushes of the oil from the oil-chamber from passing upwardly from the passages 18 and will aid in leading the oil scraped from the axles into the said oil-chamber. The axle-box is provided with lateral projections, as 20 20, having bolt-holes or other engaging means, whereby the said axle-box may be securely fastened to the body of a car or other vehicle.

From the above description it will be apparent that by my improved construction I am enabled to form an axle-box having an oil-chamber so arranged with respect to the axle-sections as to properly hold the same in place and to lubricate the said sections thoroughly and yet prevent the loss of oil at the ends of the axle-box. The parts are simple in construction and very efficient for the purposes for which they are made.

Having now described my invention, what I claim as new, and desire to secure by Letters Patent, is—

1. An axle-box comprising a body portion bored to receive axle-sections, an oil-chamber being formed below the bearing in the said axle-box, scraping-rings mounted in grooves in the said axle-box, near each end, passages leading from the said rings back to the oil-chamber for conducting the oil thereto, substantially as described.

2. An axle-box for receiving the sections of a divided axle comprising a tubular body portion having an oil-recess formed longitudinally thereof and beneath the bearing-surface, means for introducing oil into the said chamber, recesses formed at each end of the said chamber, slots leading into the same, rings mounted in the said slots and adapted to rest upon the axle-sections for carrying oil from the recesses to the same, blocks for closing the upper ends of the said slots and holding the rings in proper position, and means for maintaining sufficient oil at each end of the said chamber to lubricate the rings, substantially as described.

3. An axle-box having a bearing for receiving the divided sections of an axle, scraping-rings adapted to be inserted in grooves in the said axle-box, the said scraping-rings being divided and having one end bent at right angles for engaging a recess formed in the axle-box, said rings being adapted to prevent oil from passing outwardly upon the axle-sections, while the bent portions of the rings will operate to hold the said rings stationary with respect to the axle-sections, substantially as described.

4. In an axle-box, the combination with a main body portion having a bearing formed therein, an oil-chamber formed in the said box below the bearing, scraping-rings arranged in grooves at the ends of the axle-box and having passage-ways leading from the said rings into the oil-chamber for returning the oil thereto and packing in the said passages for preventing the oil from gushing upwardly therein, substantially as described.

In testimony whereof I hereunto affix my signature in presence of two witnesses.

FRANK E. HAWKSWORTH.

Witnesses:
L. W. HEATH,
AUGUST ELGE.